Patented Feb. 25, 1936

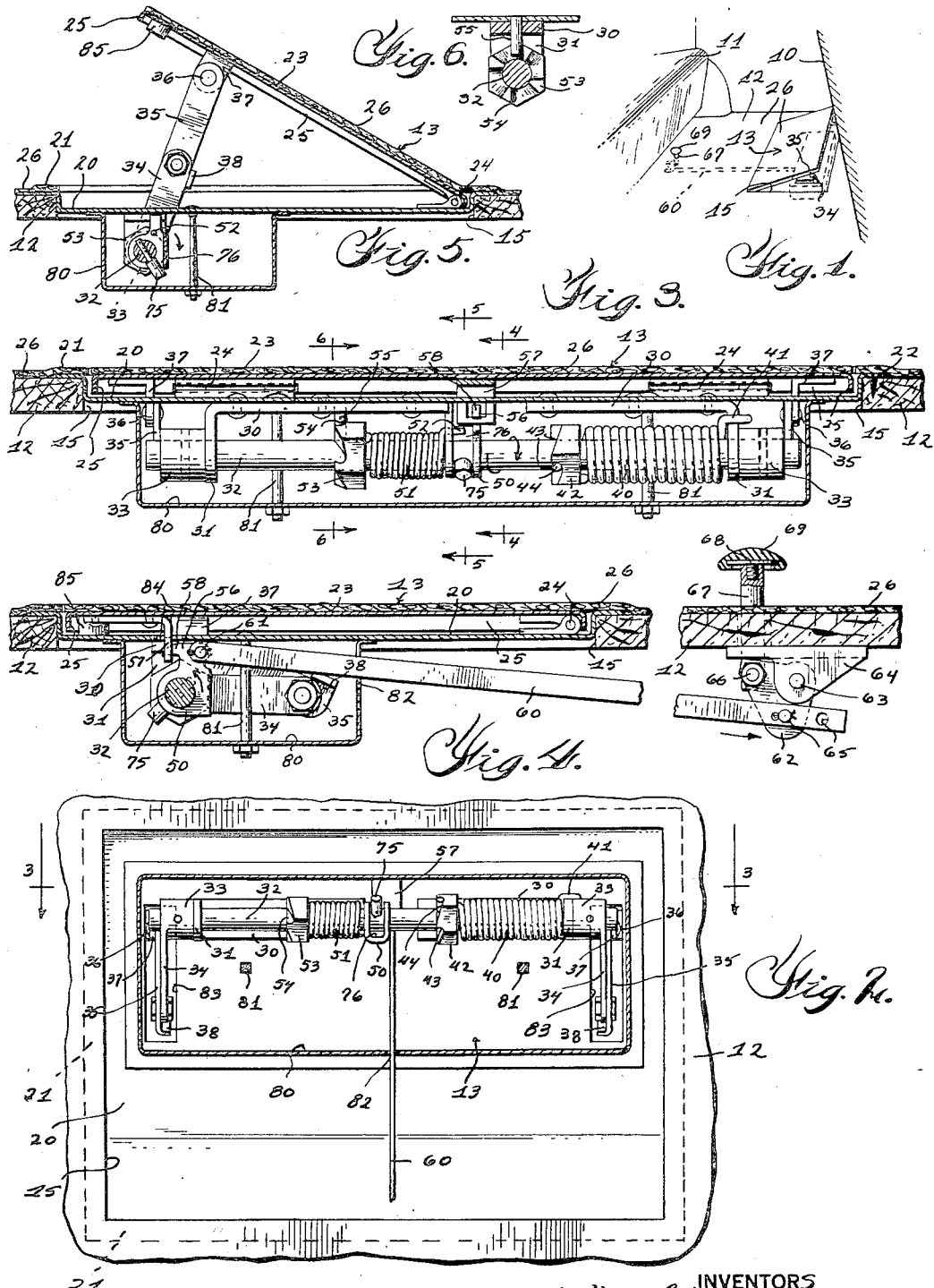

2,032,157

UNITED STATES PATENT OFFICE 2,032,157

FOOTREST

William C. Van Dresser and Wesley B. Van Dresser, Detroit, Mich., assignors to Van Dresser Specialty Corporation, Detroit, Mich., a corporation of Michigan Application September 1, 1932, Serial No. 631,430

10 Claims. (Cl. 296—75)

This invention relates to a foot rest adapted more particularly for use in a motor vehicle or the like.

One of the primary objects of this invention is to provide a foot rest of the above mentioned character which when not in use may be moved to a position where it lies flush with the floor of the vehicle with which it is associated.

A further object of this invention is to provide a foot rest of the above mentioned character in which the movement of the foot rest from inoperative to operative positions may be effected from a point remote from the foot rest and without the necessity of the operator touching the foot rest with the hands.

The invention further contemplates the provision of a foot rest which may be locked in its operative position and the provision of means whereby this locking means may be released without directly touching the foot rest.

The invention still further contemplates the provision of a construction which will be simple in construction and which may be therefore economically manufactured on a commercial scale.

Numerous other objects and advantages of this invention will become more apparent as the following description proceeds, particularly when reference is had to the accompanying drawing, wherein:

Fig. 1 is a fragmentary perspective view of the interior of a motor vehicle showing a foot rest constructed in accordance with the teachings of this invention incorporated in the floor of the vehicle;

Fig. 2 is a bottom plan view of the actuating mechanism for the foot rest shown in Fig. 1, a part of the enclosing housing being broken away;

Fig. 3 is a sectional view taken substantially on the line 3—3 of Fig. 2;

Fig. 4 is a sectional view taken substantially on the line 4—4 of Fig. 3;

Fig. 5 is a sectional view taken substantially on the line 5—5 of Fig. 3; and

Fig. 6 is a sectional view taken substantially on the line 6—6 of Fig. 3.

Heretofore it has been the custom for motor vehicle manufacturers to swingingly mount a bar on the floor of the vehicle body in front of the rear seat of the vehicle, this bar constituting a foot rest for passengers in the rear seat. This bar, however, being always above the floor of the vehicle, constitutes a substantial nuisance when it is desired to place packages, luggage or the like on the floor of the vehicle. This bar also frequently causes injury to occupants of the car who in entering or leaving the car trip over the rail.

The present invention contemplates the provision of a foot rest which, when in use, may assume a position inclined at the proper angle for comfortably supporting the feet of a person occupying the rear seat of the vehicle. The invention further contemplates the provision of means for locking the foot rest in this operative position together with means for releasing this locking means and for then locking the foot rest in a position where it lies flush with the floor of the vehicle, thus presenting no obstruction whatsoever.

Referring then particularly to the drawing, wherein like reference characters designate corresponding parts throughout all views, there is fragmentarily shown in Fig. 1 of the drawing the interior of a motor vehicle, the numeral 10 designating the rear of the front seat of the vehicle and the numeral 11 designating a portion of the rear seat. The numeral 12 designates the floor of the vehicle, in which floor a foot rest designated generally by the reference character 13 is mounted.

According to the teachings of this invention, the floor 12 is cut to provide an opening 15 of a width substantially equal to that desired in the foot rest and of any desired length. As illustrated in the drawing, the opening is shown as being of such length that two of these openings would be required to span the width of the floor 12, although it is to be clearly understood that if desired the opening 15 may extend substantially the entire width of the floor 12 and a single movable foot rest provided for all of the occupants of the rear seat of the vehicle.

Fitted in the recess is a shallow casing 20, this casing being conveniently secured in place by providing a peripheral flange 21 on the same and by securing this flange as by screws 22 to the portion of the floor 12 surrounding the opening 15. The casing 20 is of sufficient depth to receive a plate 23 which is hinged at its rear edge to the floor of the casing, as designated by the reference character 24. The plate 23 constitutes the foot rest and is preferably provided on its periphery with a depending flange 25 which is received within the casing 20 when the foot rest is in the position shown in Fig. 3 of the drawing. It will be noted that when the foot rest is in its inoperative position its upper surface is substantially flush with the upper surface of the floor 12, and since both the floor and the foot rest are covered by carpet, as designated by the reference character 26, the foot rest in inoperative position cooperates with the floor to provide a substantially unbroken surface.

Fixed to the under surface of the casing 20 and adjacent the forward edge thereof are angle brackets 30 having depending flanges 31 which constitute bearings for a shaft 32. This shaft extends lengthwise of the opening 15, and fixedly mounted on the shaft adjacent the ends thereof are hubs 33. Fixedly mounted on each hub is a link 34, and each link has its free end pivotally connected to a second link 35. The remote ends of these second links are pivotally connected as at 36 to angle plates 37 fixedly secured to the plate 23 adjacent the forward edge thereof. Each link 35 has a laterally bent ear 38 adapted to engage the adjacent edge of its associated link 34 when the links 34 and 35 are in the position shown in Fig. 5 of the drawing to limit movement of the links relative to each other in one direction.

Coiled on the shaft 32 is a spring 40 having one end anchored as at 41 in the portion 31 of the angle plate 30 to which it is adjacent. The opposite end of the spring 40 is anchored to a nut 42 rotatably mounted on the shaft 32, and this nut is provided on its one face with the teeth 43 adapted to engage a pin 44 fixed to the shaft 32.

The teeth 43 provide means for adjusting the tension of spring 40 since it will be apparent that as the nut 42 is rotated, the spring 40 may be wound or unwound about the shaft 32. The spring 40 being anchored at its one end to a bracket 30, tends to rotate the nut 42, and since this nut is held against rotation with respect to the shaft 32 by virtue of one of its teeth 43 engaging the pin 44, the spring 40 tends to rotate shaft 32 in the direction of the arrow in Fig. 3 of the drawing.

It will be understood that the links 34 and 35 constitute toggle connections between the shaft 32 and the plate 23. When the plate 23 is in its inoperative position or, in other words, flush with the floor of the vehicle, the toggle links are in the position shown in Fig. 4 of the drawing. The spring 40, however, constantly tends to rotate shaft 32 to move links 34 and 35 to their extended position to thus move the foot rest to its inclined operative position. As brought out before, the links are prevented from moving past their full straight line position by the stop 38 engaging an adjacent edge of link 34.

Rotatively mounted on the shaft 32 and preferably substantially centrally thereof is a yoke 50. A spring 51 coiled about the shaft 32 has one end 52 secured to the yoke 50 and has its other end secured to a nut 53 which is rotatively journaled on shaft 32. Nut 53 constitutes a means for adjusting the tension of spring 51 and for this purpose is provided with the teeth 54 adapted to engage a pin 55 fixed to and depending from the adjacent bracket 30. It will be obvious that the nut may be locked in adjusted position on the shaft by the pin 55 and that rotative adjustment of the nut will adjust the tension of the spring 51 and thus the force exerted by the spring on the yoke 50.

Yoke 50 is constantly urged in the direction of the arrow in Fig. 4 of the drawing by spring 51 and is provided with a hook portion 56 adapted to engage a keeper 57 secured to and depending from the plate 23. It will be noted that the hook 56 is provided on its upper edge with a cam surface 58 so arranged that when the plate 23 is forced downwardly, the keeper 57 will ride over the end of the hook so that the hook may engage the keeper.

For moving the yoke against the force exerted on the same by the spring 51, there is provided a link 60 which is pivotally secured to the yoke as at 61. This link extends rearwardly from the yoke 50 and is secured at its rear end to a plate 62 which is pivotally mounted as at 63 on a bracket 64 secured to the under side of the floor 12. It is preferable to provide a plurality of openings 65 in the link 60 to provide for longitudinal adjustment of the link with reference to plate 62.

Pivotally secured to the plate 62 as at 66 is an actuating stem or shank 67. A head 68 preferably has threaded engagement with the upper end of this shank, and this head may, if desired, be provided with a rubber covering 69.

The plate 62 constitutes in substance a bell crank connection between shank 67 and link 60 operating upon depression of the shank to effect a longitudinal movement of the link in the direction indicated by the arrow in Fig. 4 of the drawing. It will be apparent that with the parts in the position shown in Fig. 4 of the drawing, depression of the shank 67 will move the link 60 rearwardly to withdraw hook 56 from keeper 57. As soon as the keeper 57 is released, the spring 40, acting through shaft 32 and toggle links 34 and 35, will move the foot rest to its elevated position, as shown in Figs. 1 and 5 of the drawing.

The operating shank 67 constitutes not only a means for releasing the catch 56, but constitutes also a means for effecting an initial breaking of the toggle links 34 and 35 whereby the foot rest may be moved to its inoperative position by merely exerting pressure on the upper surface of the foot rest. For this purpose a pin 75 is fixed to the shaft 32 between the legs of the yoke 50. This pin projects from the shaft so as to extend in the path of travel of the web 76 which connects the legs of the yoke 50.

With the foot rest in its operative position, as shown in Fig. 5 of the drawing, it will be apparent that if the shank 67 is depressed, link 60 will be moved rearwardly to rock yoke 50 about shaft 32 in the direction of the arrow in Fig. 5 of the drawing. This will cause web 76 to engage pin 75 and to thus rotate shaft 32 sufficiently to effect an initial breaking of the toggle connections formed by the links 34 and 35. After these toggle connections have been initially broken, the foot rest may be moved to its inoperative position by merely stepping on the same, and the foot rest will be held in its inoperative position by engagement of the hook 56 with the keeper 57.

It will be noted, by reference to Fig. 3 of the drawing, that the hook 56 is formed on one leg only of the yoke 50. The other leg extends upwardly so as to engage the adjacent end of the bracket 30 to limit rotation of the yoke with reference to the shaft under the force exerted by the spring 51. Thus the yoke will be held in a position to be operatively connected with the keeper 57 when the foot rest is moved to its inoperative position.

For the purpose of enclosing the shaft 32 and associated structure, a housing 80 may be secured to the under side of the casing 20 as by bolts 81. This housing is provided with a slot 82 in its rear wall through which the link 60 passes, while the casing 20 is provided with slots 83 and 84 through which the toggle links and the keeper 57, respectively, pass. The under surface of the foot rest tray is preferably provided adjacent the forward edge thereof with downwardly extending protuberances or bosses 85 which may be metal or rubber and which are arranged to engage the upper surface of the casing 20 when the foot rest plate is in its inoperative position.

From the above it is believed that the structure and operation of the invention will be clearly apparent. The invention provides a foot rest movable from an operative inclined position to an inoperative position where it lies flush with the floor of the vehicle. Spring means acting through toggle links tends to constantly move the foot rest to its operative position, and when the foot rest is in this position the toggle links are in their straight line position and thus lock the foot rest against collapsing.

A single actuating pedal is provided which, if operated when the foot rest is in its operative position, will effect an initial breaking of the toggle links so that the foot rest may be readily moved to its inoperative position by merely exerting a pressure on the upper surface of the same as by stepping on the foot rest. When the foot rest is in its inoperative position it is prevented from moving to operative position by the hook 56, and the foot pedal provides means for releasing this lock, whereby the spring 40 may immediately move the foot rest to its operative position. It will be apparent that the spring 51 acting through link 60 and plate 62 will tend at all times to hold the foot pedal in its raised position.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What we claim as our invention is:

1. In a device of the character described, a foot rest plate hingedly mounted for movement to operative and inoperative positions, toggle links connected to said foot rest plate for actuating the same and for locking the same in its operative position, a shaft connected to said toggle links for actuating the same, resilient means associated with said shaft and tending to rotate the same in a direction to move said foot rest plate to its operative position, and means remote from said foot rest plate and shaft and so associated with said shaft as to rock the same to break the toggle connections when the foot rest plate is in operative position whereby the foot rest plate may be moved to its inoperative position by the exertion of pressure on the same.

2. In a device of the character described, a foot rest plate mounted for movement to operative and inoperative positions, a rotatable shaft, links connecting said shaft to said foot rest plate for moving the latter from the former, resilient means associated with said shaft tending to rotate the same in a direction to move said foot rest plate to its operative position, a keeper fixed to said foot rest plate, and a member rotatably mounted on said shaft and engageable with said keeper for locking said foot rest plate in its inoperative position.

3. In a device of the character described, a foot rest plate hingedly mounted in an opening in the floor of a vehicle for movement from an inoperative position substantially flush with the floor to an operative position inclined with reference to the floor, a shaft rotatably mounted adjacent the free edge of said foot rest plate, links forming toggle connections between said shaft and said foot rest plate for actuating the latter from the former, resilient means connected to said shaft for rotating the same in a direction to move said foot rest plate to its inclined position, a member rotatably mounted on said shaft and having a hook portion engageable with a keeper on said foot rest plate for locking said foot rest plate in its inoperative position, and a pin fixed to said shaft and arranged to be engaged by a portion of said member when said member is rotated on said shaft while the foot rest plate is in its inclined position to rotate said shaft to effect a breaking of the toggle connections whereby said foot rest plate may be moved to its inoperative position.

4. In a foot rest, a casing inset in the floor of a vehicle, a foot rest plate hingedly secured to said casing adjacent the rear edge thereof for movement from an inoperative position substantially flush with the floor to an operative position inclined with reference to the floor, brackets secured to the under side of said casing adjacent the front edge thereof, a shaft rotatably supported by said brackets, links fixedly secured to said shaft adjacent the ends thereof, additional links pivotally connected to said first mentioned links and to said foot rest plate adjacent the front edge thereof, said first and second mentioned links constituting toggle connections between said shaft and said foot rest plate for moving the latter from the former, stops on said second mentioned links cooperating with said first mentioned links to lock said toggle connections in a position to hold said foot rest plate in its operative position, a spring coiled on said shaft and having one end anchored to one of said brackets and its other end adjustably secured to said shaft for rotating said shaft in a direction to move said foot rest plate to operative position, a yoke rotatably mounted on said shaft, a hook on said yoke, a keeper on said foot rest plate adapted to be engaged by said hook when said foot rest plate is in its inoperative position whereby said hook locks said foot rest plate in its inoperative position, resilient means on said shaft and connected to said yoke tending to rotate the latter to engage the hook thereon with the said keeper, a pin on said shaft arranged to be engaged by a web on said yoke when the yoke is rotated while the foot rest plate is in its operative position whereby rotation of said yoke rotates the shaft to break the toggle connections between said shaft and said foot rest plate, a link connected to said yoke to rotate the same against the tension of the second mentioned spring, and a foot pedal connected to said link to actuate the same.

5. In a device of the character described, a foot rest mounted for movement to operative and inoperative positions, means for moving said foot rest to operative position and for locking the same therein, means separate from said first mentioned means for locking said foot rest in its inoperative position, and a single actuating member operable when said foot rest is in its operative position to release the locking means holding the foot rest in its operative position and operable when said foot rest is in its inoperative position to release the locking means holding the foot rest in its inoperative position.

6. In a device of the character described, a foot rest movable to operative and inoperative positions, a movable shaft, connections between said shaft and foot rest operable to move said foot rest to its operative position and to lock said foot rest in said position, and means for locking said foot rest in its inoperative position, said last mentioned means being operable to move said shaft to move said connections to releasing positions.

7. In a device of the character described, a foot rest movable to operative and inoperative positions, a rotatable shaft, connections between said shaft and said foot rest for moving the latter from the former, means for moving said shaft, a keeper fixed to said foot rest, and means carried by said shaft and engageable with said keeper for locking said foot rest in its inoperative position.

8. In a device of the character described, a foot rest movable to operative and inoperative positions, a rotatable shaft, toggle connections between said shaft and foot rest for actuating the latter from the former, a member rotatably mounted on said shaft and engageable with a keeper on said foot rest for locking the latter in its inoperative position, and means on said shaft arranged to be engaged by a portion of said member when the latter is rotated on the shaft while the foot rest is in its operative position to rotate said shaft to effect a breaking of the toggle connections.

9. In a device of the character described, a foot rest mounted for movement to operative and inoperative positions, means associated with the front edge of said foot rest for moving the same to operative position and for locking the same in operative position, means separate from but adjacent said last mentioned means for locking the foot rest in inoperative position, and means spaced rearwardly of the rear edge of said foot rest adapted to release either of said locking means.

10. In a device of the character described, a foot rest movable to operative and inoperative positions, means including toggle links connected to said foot rest for moving said foot rest to its operative position, said toggle links operating when extended to lock said foot rest in its operative position, means for locking said foot rest in its inoperative position, and an actuating member for moving said last mentioned locking means to locking and releasing positions, said actuating member being operable when said foot rest is in its operative position to move said toggle links out of their extended locking position.

WILLIAM C. VAN DRESSER.
WESLEY B. VAN DRESSER.